US011785027B2

(12) United States Patent
Iyer et al.

(10) Patent No.: US 11,785,027 B2
(45) Date of Patent: *Oct. 10, 2023

(54) THREAT PROTECTION IN DOCUMENTS (71) Applicant: Microsoft Technology Licensing, LLC, Redmond, WA (US)

(72) Inventors: Varagur Karthikeyan Sriram Iyer, Sammamish, WA (US); Willson Kulandai Raj David, Bothell, WA (US); Vinayak Goyal, Kirkland, WA (US); Matthew Bryan Jeffries, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/452,698

(22) Filed: Oct. 28, 2021

(65) Prior Publication Data

US 2022/0053008 A1 Feb. 17, 2022

Related U.S. Application Data

(63) Continuation of application No. 16/658,450, filed on Oct. 21, 2019, now Pat. No. 11,171,973, which is a continuation of application No. 15/581,529, filed on Apr. 28, 2017, now Pat. No. 10,454,952.

(60) Provisional application No. 62/438,887, filed on Dec. 23, 2016.

(51) Int. Cl.
*H04L 9/40* (2022.01)
(52) U.S. Cl.
CPC ...... *H04L 63/1416* (2013.01); *H04L 63/1483* (2013.01)

(58) Field of Classification Search
CPC .................. H04L 63/1416; H04L 63/1483
See application file for complete search history.

(56) References Cited

U.S. PATENT DOCUMENTS

| 7,526,730 B1 * | 4/2009 | Cahill ................... H04L 67/02 715/862 |
| 7,698,442 B1 | 4/2010 | Krishnamurthy et al. |
| 7,761,565 B2 | 7/2010 | Adelman et al. |
| 8,079,087 B1 * | 12/2011 | Spies ................... G06F 16/954 709/225 |
| 8,443,452 B2 | 5/2013 | Koulinitch et al. |
| 8,510,829 B2 | 8/2013 | Mohandas et al. |

(Continued)

OTHER PUBLICATIONS

Trend, Micro, "Flash Threats: Not Just in the Browser", http://blog.trendmicro.com/trendlabs-security-intelligence/flash-threats-not-just-in-the-browser, Jul. 30, 2015, 8 Pages.

(Continued)

*Primary Examiner* — Matthew Smithers
(74) *Attorney, Agent, or Firm* — Holzer Patel Drennan (57) ABSTRACT

A threat protection system provides for detecting links in a document and analyzing whether one of the detected links is a malicious link that may direct a user of the document to a malicious universal resource locator (URL). In one implementation of the described technology, when a user selects a link in a document, a link activation module calls a threat protection client module that performs a reputation check for the link. If the selected link is malicious, the threat protection client module sends a URL of a warning page to the link activation module.

18 Claims, 9 Drawing Sheets

(56) References Cited

U.S. PATENT DOCUMENTS

| | | |
|---|---|---|
| 8,544,097 B2 | 9/2013 | Xiong |
| 8,650,638 B2 | 2/2014 | Ma et al. |
| 8,966,582 B1* | 2/2015 | Ainslie .................. H04L 63/14 |
| | | 726/22 |
| 8,984,640 B1 | 3/2015 | Emigh et al. |
| 9,130,989 B2 | 9/2015 | Windsor et al. |
| 9,230,111 B1 | 1/2016 | Nanda et al. |
| 9,241,004 B1 | 1/2016 | April |
| 9,300,686 B2 | 3/2016 | Pidathala et al. |
| 9,338,181 B1 | 5/2016 | Burns et al. |
| 9,467,410 B2 | 10/2016 | Liebmann et al. |
| 9,548,988 B1 | 1/2017 | Roundy et al. |
| 9,686,308 B1 | 6/2017 | Srivastava |
| 10,142,366 B2 | 11/2018 | Goutal |
| 10,454,952 B2* | 10/2019 | Iyer .................... H04L 63/1483 |
| 11,171,973 B2* | 11/2021 | Iyer .................... H04L 63/1483 |
| 2005/0050222 A1 | 3/2005 | Packer |
| 2006/0021031 A1* | 1/2006 | Leahy .................... H04L 67/02 |
| | | 726/22 |
| 2008/0022013 A1 | 1/2008 | Adelman et al. |
| 2009/0037469 A1 | 2/2009 | Kirsch |
| 2010/0186088 A1 | 7/2010 | Banerjee et al. |
| 2011/0145435 A1 | 6/2011 | Bhatawdekar et al. |
| 2012/0151578 A1 | 6/2012 | Niemela |
| 2013/0198846 A1 | 8/2013 | Chapman |
| 2014/0259158 A1 | 9/2014 | Brown et al. |
| 2015/0026813 A1 | 1/2015 | Wang et al. |
| 2016/0057167 A1* | 2/2016 | Bach .................... H04L 63/101 |
| | | 726/23 |
| 2016/0065600 A1 | 3/2016 | Lee et al. |
| 2016/0156656 A1 | 6/2016 | Boggs et al. |
| 2017/0078321 A1 | 3/2017 | Maylor et al. |
| 2017/0085584 A1 | 3/2017 | Goutal |
| 2017/0324760 A1 | 11/2017 | Gorny et al. |
| 2018/0084002 A1* | 3/2018 | Shnitzer .............. H04L 63/1416 |

OTHER PUBLICATIONS

"Piano Lessons, Guitar Lessons, Singing, Drums, & Violin for Kids, Adults, & Beginners", Retrieved From: https://www.44school.com/, Retrieved Date: Dec. 10, 2021, 7 Pages.
"Venues in Woodinville, WA", Retrieved From: http://www.inwoodinville.com/venues/, Retrieved Date: Oct. 12, 2021, 5 Pages.
Msfttracyp, et al., "Microsoft Defender for Office 365 Security Overview", Retrieved From: https://docs.microsoft.com/en-us/microsoft-365/security/office-365-security/overview?view=o365-worldwide, Oct. 6, 2021, 8 Pages.
"Research, News, and Perspectives", Retrieved From: https://www.trendmicro.com/en_us/research.html, Dec. 7, 2021, 4 Pages.
"How-To Protect Against Attachment Based Attacks Using Cisco Email Security", https://www.cisco.com/c/dam/en/us/products/collateral/security/email-security-appliance/guide-c07-738016.pdf, Retrieved on: Dec. 20, 2016, 15 pages.
"Targeted Attack Protection (TAP)", https://www.wright.edu/information-technology/security/targeted-attack-protection-tap, Retrieved on: Dec. 20, 2016, 2 pages.
"Advanced threat protection for safe attachments and safe links", https://technet.microsoft.com/en-us/library/mt148491 (v=exchg.150).aspx, Retrieved on: Dec. 23, 2016, 3 pages.
"IE8 Security Part III: Smartscreen Filter", https://blogs.msdn.microsoft.com/ie/2008/07/02/ie8-security-part-iii-smartscreen-filter/, Published on: Jul. 2, 2008, 16 pages.
"What is Safe Browsing?", https://developers.google.com/safe-browsing/, Retrieved on: Dec. 23, 2016, 1 pages.

* cited by examiner

THREAT PROTECTION IN DOCUMENTS

CROSS-REFERENCE TO RELATED APPLICATIONS

The present application is a continuation of and claims benefit of priority to U.S. patent application Ser. No. 16/658,450, filed Oct. 21, 2019, and entitled "THREAT PROTECTION IN DOCUMENTS," which is a continuation of and claims benefit of priority to U.S. patent application Ser. No. 15/581,529, filed Apr. 28, 2017, now U.S. Pat. No. 10,454,952, issued Oct. 22, 2019, entitled "THREAT PROTECTION IN DOCUMENTS," which claims benefit of priority to U.S. Provisional Patent Application No. 62/438,887, entitled "THREAT PROTECTION IN DOCUMENTS" and filed on Dec. 23, 2016, which is specifically incorporated by reference for all that it discloses and teaches.

BACKGROUND

Phishing is the activity of defrauding a user of financial or other information by posing as a legitimate company. Phishing is popular with cybercriminals, as it is far easier to trick someone into clicking a malicious link than trying to break through a computer's defenses. Links to malicious websites remain a popular method for phishing and exploiting users. Phishing entities entice users to malicious websites by providing them links in the form of universal resource locators (URLs) of the malicious websites. The goal of the phisher is generally to capture critical data such as credit card number or login/password credentials. For this purpose, the phisher sends an email to the victim that contains a URL that will lead the victim to a forged or malicious website where the victim is induced to enter the sought-after personal and financial information.

SUMMARY

The described technology provides a threat protection system for detecting links in a document and analyzing whether one of the detected links is a malicious link that may direct a user of the document to a malicious universal resource locator (URL). In one implementation of the described technology, when a user selects a link in a document, a link activation module calls a threat protection client module that performs a reputation check for the link. If the selected link is malicious, the threat protection client module sends a URL of a warning page to the link activation module.

In an alternative implementation, the link activation module includes a time out mechanism that activates the timer when the threat protection client module is called to perform a reputation check for the link. In such an implementation, when the timer times outs before receiving a response from the threat protection client module, the link activation module activates the selected link.

In another alternative implementation, the described threat protection system includes a link batch module that analyzes a document when the document is opened and batches all the links in the opened document. The link batch module calls the threat protection client module to perform a reputation check for the batch of links. In such an implementation, the link batch module may cache the information received from the threat protection client module about each of the links. When a user selects a link, the link activation module refers to the cache of information to determine whether to activate the selected link or to activate a link to a warning page.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components.

DETAILED DESCRIPTIONS

The described technology provides a threat protection system for detecting links in a document and analyzing whether one of the detected links is a malicious link that may direct a user of the document to a malicious universal resource locator (URL). As used herein, use of the term "link" includes a hyperlink, a web link, a document link, etc. Specifically, a link connects a user from one location in document to another within the document or outside the document. For example, a hyperlink connects a user from a location in a hypertext document to another location. Similarly, a web link is a connection from one web resource to another web resource. In one implementation, a link has two ends and a direction with the link starting at a source anchor and pointing to a destination anchor. For example, the destination anchor may be any resource such as an image, a video clip, a sound bite, a program, a hypertext markup language (HTML) document, an element within an HTML document, a universal resource locator (URL), etc.

In one implementation of the described technology, when a user selects a link in a document, a link activation module calls a threat protection client module that performs a reputation check for the link. If the selected link is malicious, the threat protection client module sends a URL of a warning page to the link activation module.

Phishing is the activity of defrauding a user of financial or other information by posing as a legitimate company. Phishing entities entice users to malicious websites by providing them links in the form of universal resource locators (URLs) of the malicious websites. As used herein the term link is used to refer to a selectable link in a document, such as an email, a spreadsheet, a presentation, etc., that directs the user to another document another website, a URL, another location in the same document, etc. The term "link" and "link" are used interchangeably. Emails continue to be a popular means for phishing and exploiting users. However, other documents such as spreadsheets, presentations, etc., may also be used for phishing attacks. Furthermore, phishing attackers may circumvent a client's firewall and other systems by including links to malicious target websites within such documents.

For example, in a user scenario, Jason is an information technology (IT) administrator of a client organization that sees users within the organization targeted by phishing attack campaigns that link to sites that either aim to phish the user for their credentials or install malware onto their machine. Despite ongoing attempts to educate users, Jason has been part of multiple incidents involving end user compromise. Jason may use an email feature that rewrites links in mails delivered to the users' enterprise mailbox. The URLs are rewritten to point to a proxy verification service that performs time of click verification of the URL the user wants to navigate to. In the event the URL is malicious, the user is warned and steered away from navigating to the unsafe link.

A threat protection system disclosed herein also allows Jason to set up the client organization's IT such that URLs embedded within various documents, such as presentations, spreadsheets, etc., are also verified using a threat protection client module. This protects users in his enterprise from phishing attacks that attempt to exploit unwitting users by luring them to click on links in such documents.

As an example, Alice and Bob are employees of certain Fabrikam Corp. that has deployed the threat protection system disclosed herein. Alice and Bob may be targeted by Charlie, a member of a sophisticated attack group Zeleet. Charlie may be hosting a malicious payload on a phishing site, and he knows that Alice and Bob are protected by a threat protection system which scans links in emails and understands sending a link to this via email would be detected. Instead Charlie crafts a spreadsheet document with a malicious link and sends it to Alice and Bob at their work address. Alice and Bob receive this document and are intrigued to click on the link, however, they are relieved to discover that the spreadsheet did a just in time check to determine that the URL was malicious and stopped them from visiting the site.

Furthermore, Charlie may also send the same spreadsheet document to Bob's personal address. In such as case, the spreadsheet software on Bob's machine may be able to detect that the link in the document is malicious and prevent Bob from opening the file, thus protecting his identity and his machine. This approach involves performing a time of click verification of the target URL reputation that a user wants to navigate to by intercepting a link activation flow and performing a URL reputation check. If the reputation check returns that the URL is malicious, the user will be redirected to a warning page instead of the original target URL.

Figure 1:
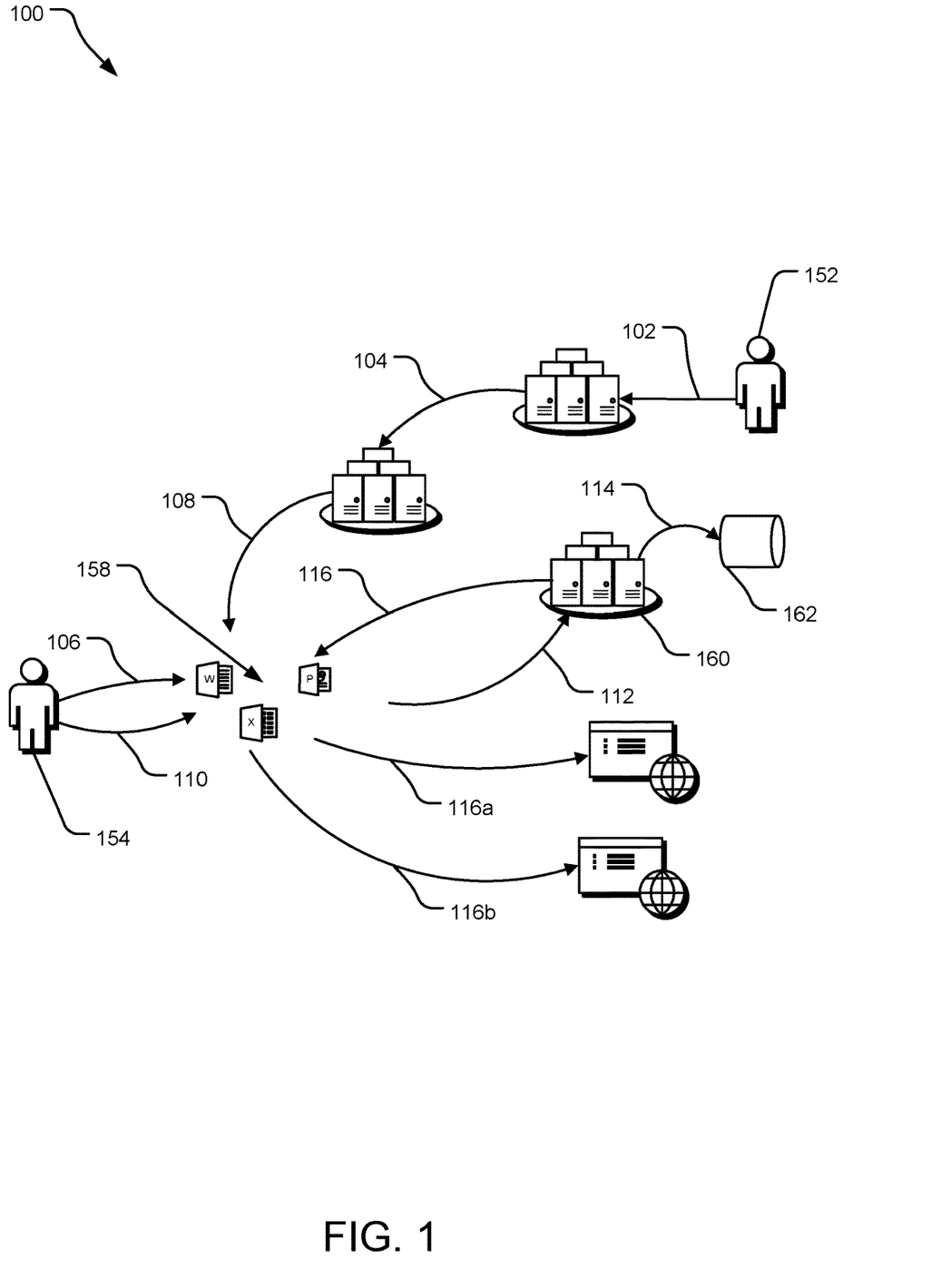
FIG. 1 illustrates an example threat protection system disclosed herein.

FIG. 1 illustrates a threat protection system 100 disclosed herein. At 102 an administrator 152 of a client configures the settings of a threat protection system for the client organization's IT system. For example, the administrator 152 may have access to settings within an administrative portal to configure the threat protection system to enable or disable the threat protection system, to track clicks by end users on various links, to allow click through to certain original target URLs, to add URLs to be excluded, etc.

At 104, the policy settings from the organization's settings are sync'd to the configuration service for various users. A set of predetermined criteria may be used to enable the threat protection system disclosed herein. For example, when a user has an organizational identity, such as school or work identity associated with them, the threat protection system should be turned on. Similarly, if such organizational identity is licensed for threat protection functionality, it should be turned on.

A client software on a user's computing system may sync the policy setting upon first idle of the client software and may sync the policy settings if an organizational identity is associated with the user. In one implementation, if a user has multiple work identities with the threat protection system, the user may need to call a policy setting sync service for each identity.

Furthermore, the administrator 152 of the organization may also determine policy settings regarding time to live (TTL) for the policy settings for a user. For example, if a user account of the organization does not have a policy setup, the software 158 may check on every boot up for the policy settings. If a user account of the organization does have a policy setup, a software 158 may cache the policy setting for a predetermined time-period, such as twenty-four (24) hours and check for updates to the policy setting at the end of such predetermined time-period.

At 106, a user 154 may open the software 158 such as a spreadsheet software, a presentation software, etc. A user's client account of the software 158 may retrieve the policy settings for the threat protection system from the organization's policy settings. If the user has a work identity, that is if the user has a work identity associated with the software, then the organization's policy settings for the threat protection are applied. If the user has no work identity, that is the user opens the software using a personal account then the threat protection features may not be activated in a document opened by the software.

At 108, the settings from the organization system are sync'd to the user's software upon boot. For example, such settings may be sync'd to the user 152's presentation software, spreadsheet software, etc. The document opened by the user 152 may include various links. At 110, the user 152 selects one of such links. For example, the user 152 may select such a link by clicking on the link. In response to the user's selecting of the link, at 112 a link activation module within the software 158 calls a threat protection client module 160 with the selected or target link.

The threat protection client module 160 may be implemented on a server on a cloud or in some other location that is accessible by the software 158 via the Internet, etc. The threat protection client module 160 may include a telemetry log 162 that may be used to report detections on client to the enterprise administrator 152. At 114, the threat protection client module 160 verifies the selected link or the target link against a database of malicious links to determine if the target link is a malicious link or not.

At 116, the threat protection client module 160 responds to the link activation module of the software 158 with information about whether the target link is malicious or not. If the target link is not malicious, at 116a, the link activation module of the software 158 navigates to the target URL. If the target link is malicious, at 116b, the link activation module of the software 158 navigates to a custom warning page warning the user that the target URL may be malicious.

Figure 2:
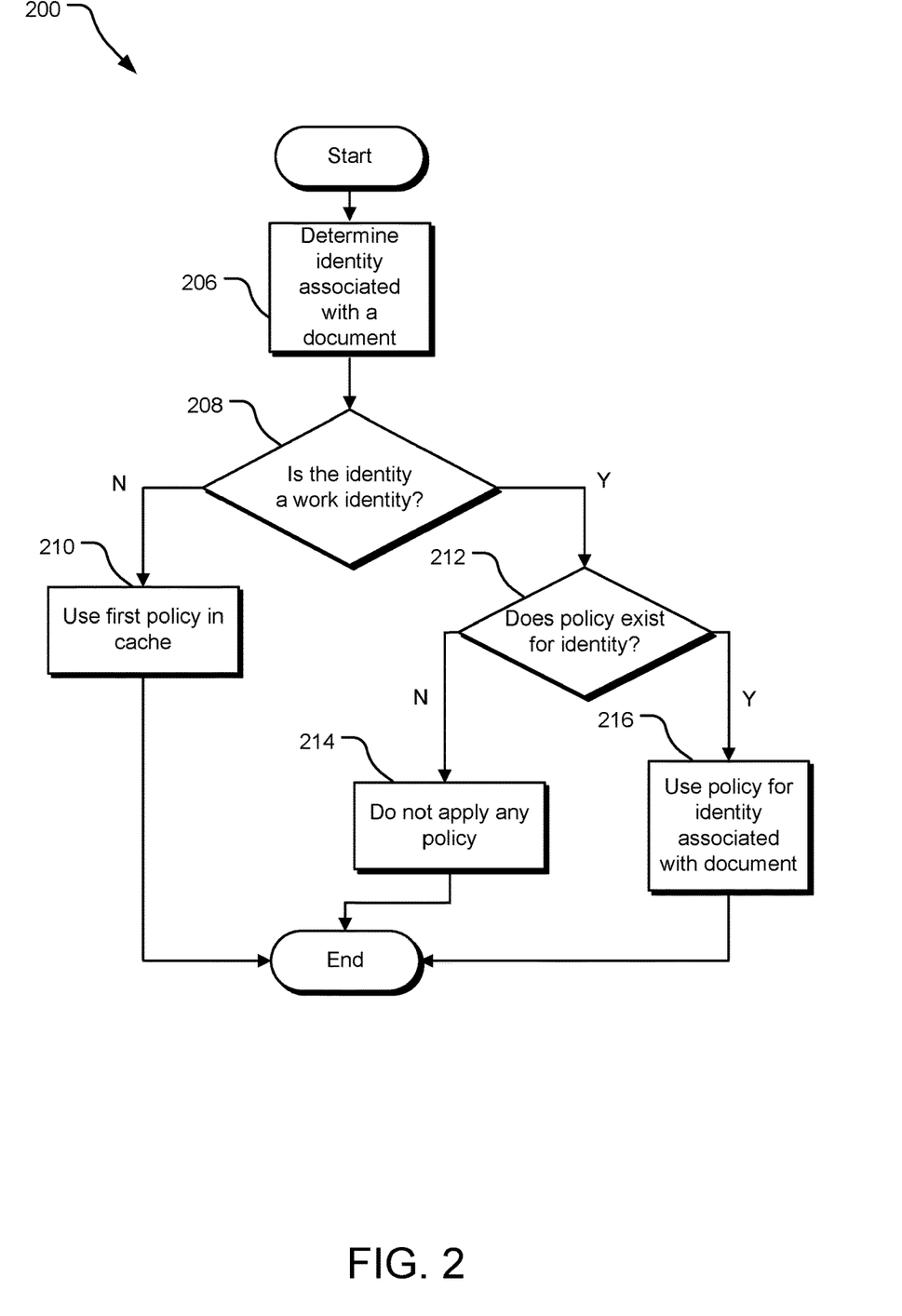
FIG. 2 illustrates example operations performed by the one or more modules of the threat protection system disclosed herein.

FIG. 2 illustrates operations 200 performed by the one or more modules of the threat protection system disclosed herein. Specifically, the operations 200 are for determining and applying policy settings for a document opened by a user when the software may have threat protection features available. An operation 206 determines an identity associated with a document.

An operation 208 determines if the identity is a work identity. If not, an operation 210 uses a first policy in cache for the document, which may be to simply call a link activation module that will activate the link. If no, an operation 212 determines if a threat protection policy exists for a given identity of the user (organizational identity, personal identity, etc.). If yes, an operation 216 uses the policy for the given identity of the user to process the target URL. If no, an operation 214 does not apply any threat protection policy. One or more of the operations 200 may be executed by a client located on a user computing device, a client located on an enterprise server, or a cloud based service.

Figure 3:
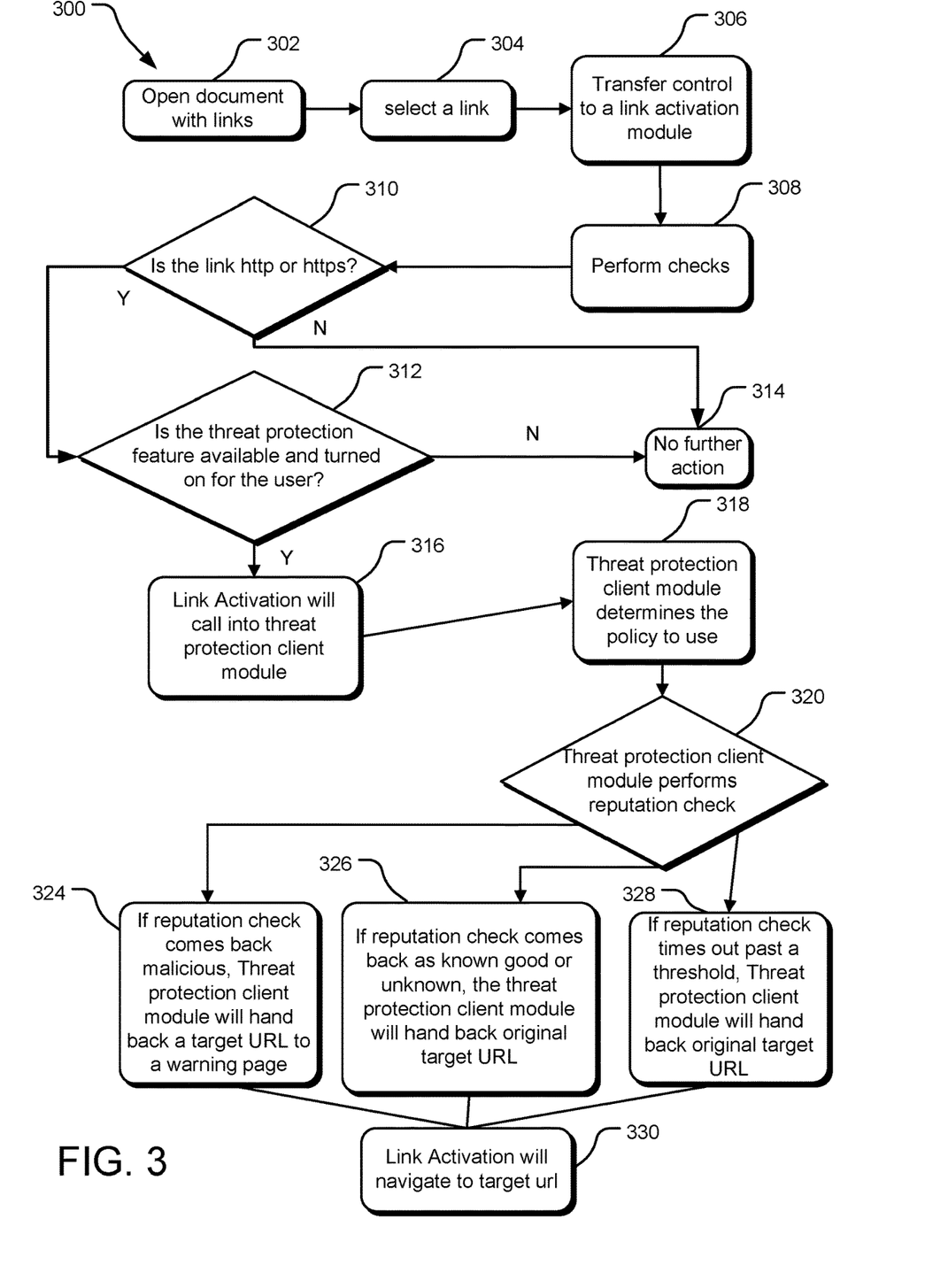
FIG. 3 illustrates example operations performed by the one or more modules of the threat protection system disclosed herein.

FIG. 3 illustrates example operations 300 performed by the one or more modules of the threat protection system disclosed herein. Specifically, the operations 300 illustrate operations for verifying reputation of a link or a URL when a user has selected such link or URL. At 302 a user opens a document, such as a spreadsheet, a presentation, etc., with one or more links. At 304, the user selects a target link by, for example, clicking on a link. At 306, the client software, such as a presentation software, a spreadsheet software, etc., transfers control to a link activation module for processing the link. The link activation module may be configured to handle navigation to the desired target link. In one implementation, the link activation module may have the functionality to determine whether to throw a warning prompt based on type of a target URL. For example, the link activation module may be configured to throw a warning prompt for a first group of URLs and not for a second group of URLs.

At 308 the link activation module performs various checks. Specifically, an operation 310 determines if the target link is a secure link (https) or a non-secure link (http). An operation 312 determines if a threat protection feature is available and turned on for the user opening the document. For example, such determination may be made by evaluating a cached threat protection policy. If the answer to either 310 and 312 is no, no further action is taken at an operation 314 and the target link may be processed by a link activation module in its normal course.

If answers to both 310 and 312 is yes, at operation 316, the link activation module calls a threat protection client module with the target link. At operation 318, the threat protection client module determines the policy to evaluate the target link. Based on the policy, at operation 320, the threat protection client module evaluates the reputation of the link. For example, such evaluation may be made by comparing the target link with various malicious links saved in a database. One or more of the operations 300 may be executed by a client located on a user computing device, a client located on an enterprise server, or a cloud based service.

If the reputation check comes back as malicious, at operation 324 the threat protection client module hands back a URL of warning page back to the link activation module. For example, such a warning page may be like a warning page 400 disclosed in FIG. 4. If the reputation check comes back as good or unknown, at operation 326, the threat protection client module hands back the original target link or URL to the link activation module. If the threat protection client module times out past a predetermined threshold time, at an operation 328, the threat protection client module hands back the original target link to the link activation module. At an operation 330, the link activation module navigates to a URL, which may be the original target URL or a URL of a warning page.

Figure 4:
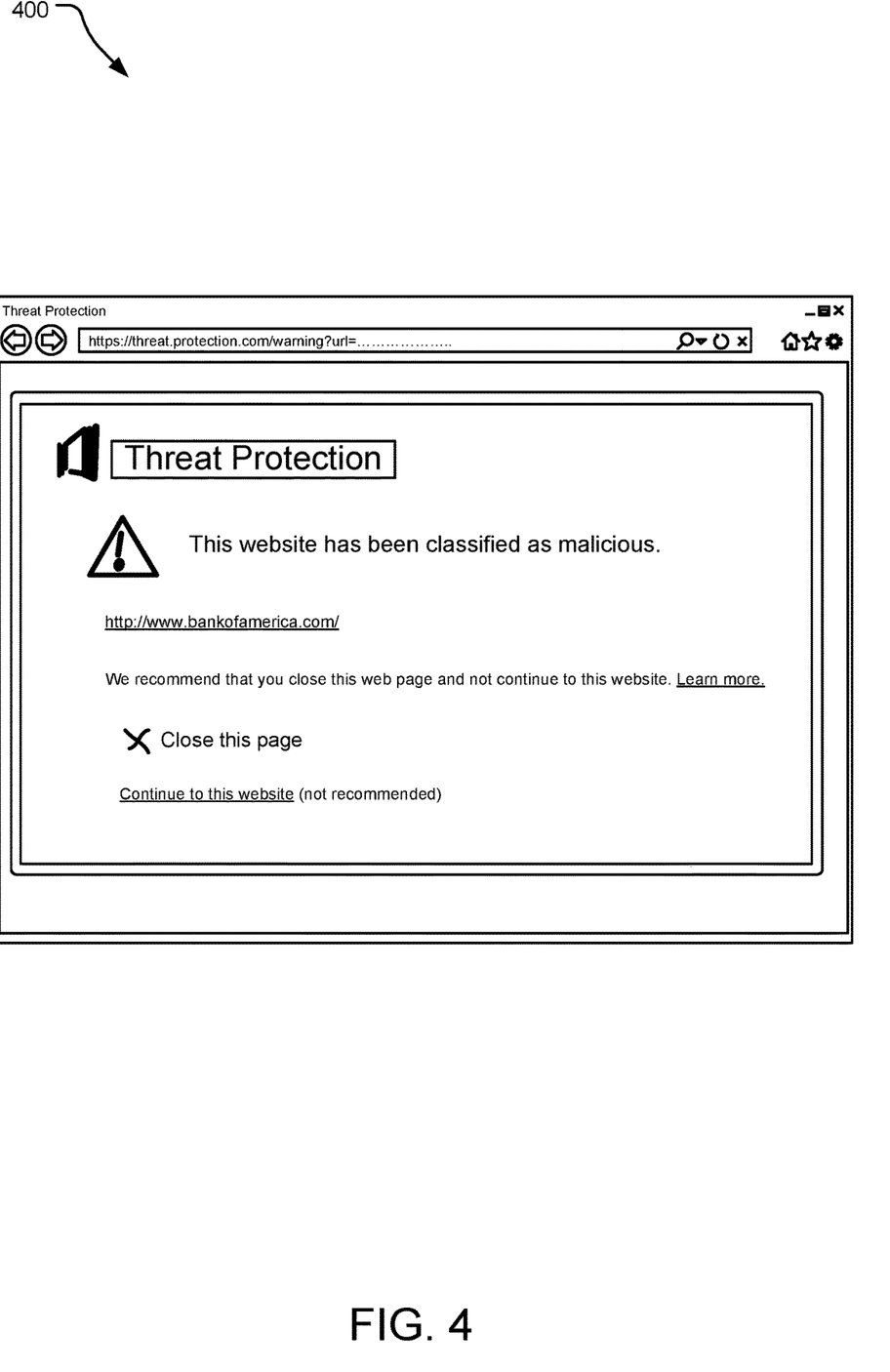
FIG. 4 illustrates an example warning page that may be presented to a user by the threat protection client module disclosed herein.

FIG. 4 illustrates an example warning page 400 that may be presented to a user if the threat protection client module determines that the original target URL is a malicious link.

Figure 5:
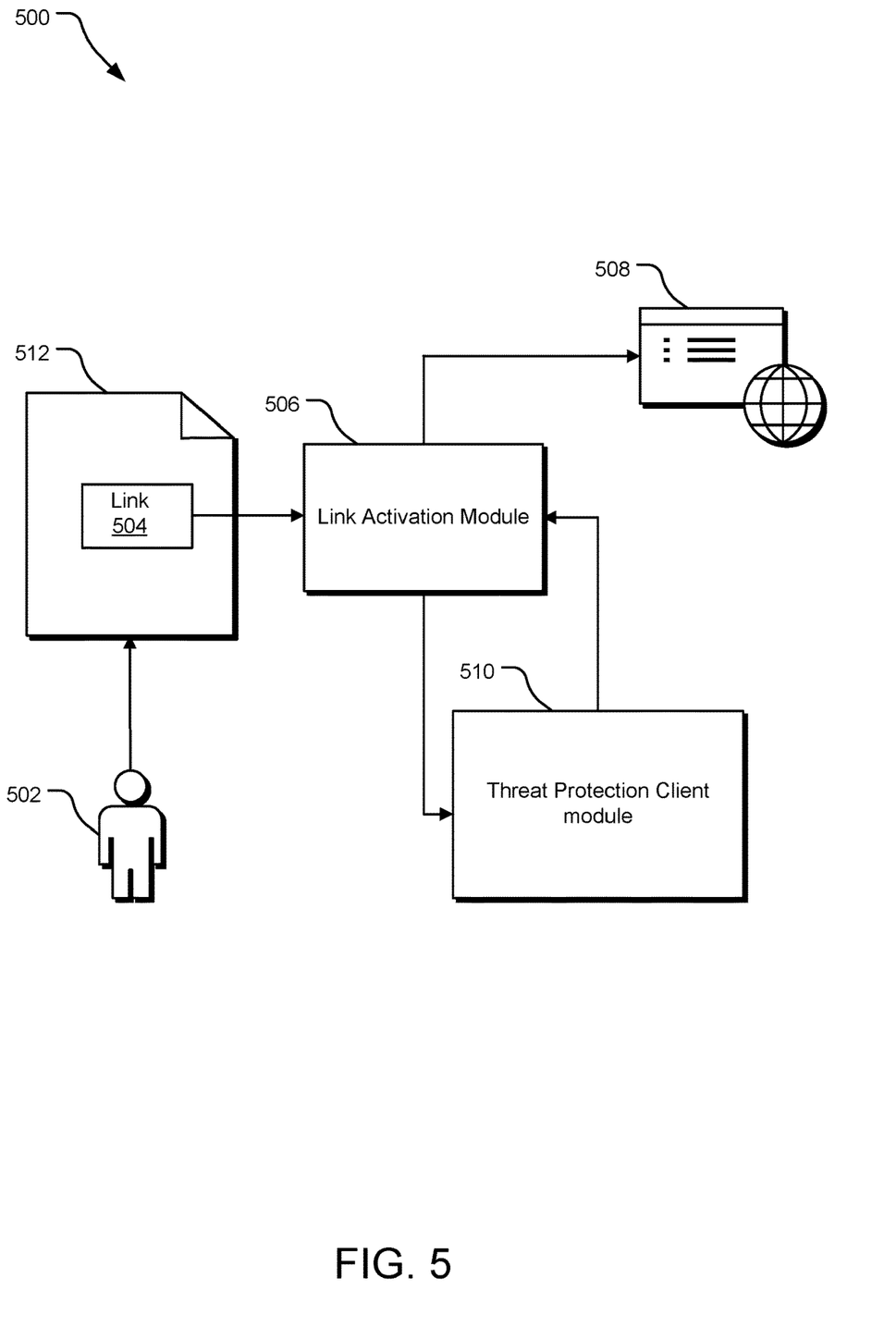
FIG. 5 illustrates example operations performed by the one or more modules of the threat protection system disclosed herein.

FIG. 5 illustrates an example block diagram 500 of the threat protection system disclosed herein. Specifically, a user 502 may select a target link 504 in a document 512 with the threat protection feature activated therein. In response, a URL associated with the target link is passed on to a link activation module 506. The link activation module 506 determines the appropriate threat protection policy for the document and calls a threat protection client module 510. Specifically, the link activation module 506 may call the threat protection client module 510 with various metadata together with the URL associated with the target link including user authentication token, application name, application version, operating system name, session identification, client type, client identification, etc.

The threat protection client module 510 may verify the reputation of the target link and/or the URL associated with the target URL. If the target link is determined to be malicious, URL of a waring page, such as the warning page 400 is returned to the link activation module 506. If the target link is determined to be not malicious the link activation module 506 navigates to the target URL 508 via a network, such as the Internet.

Figure 6:
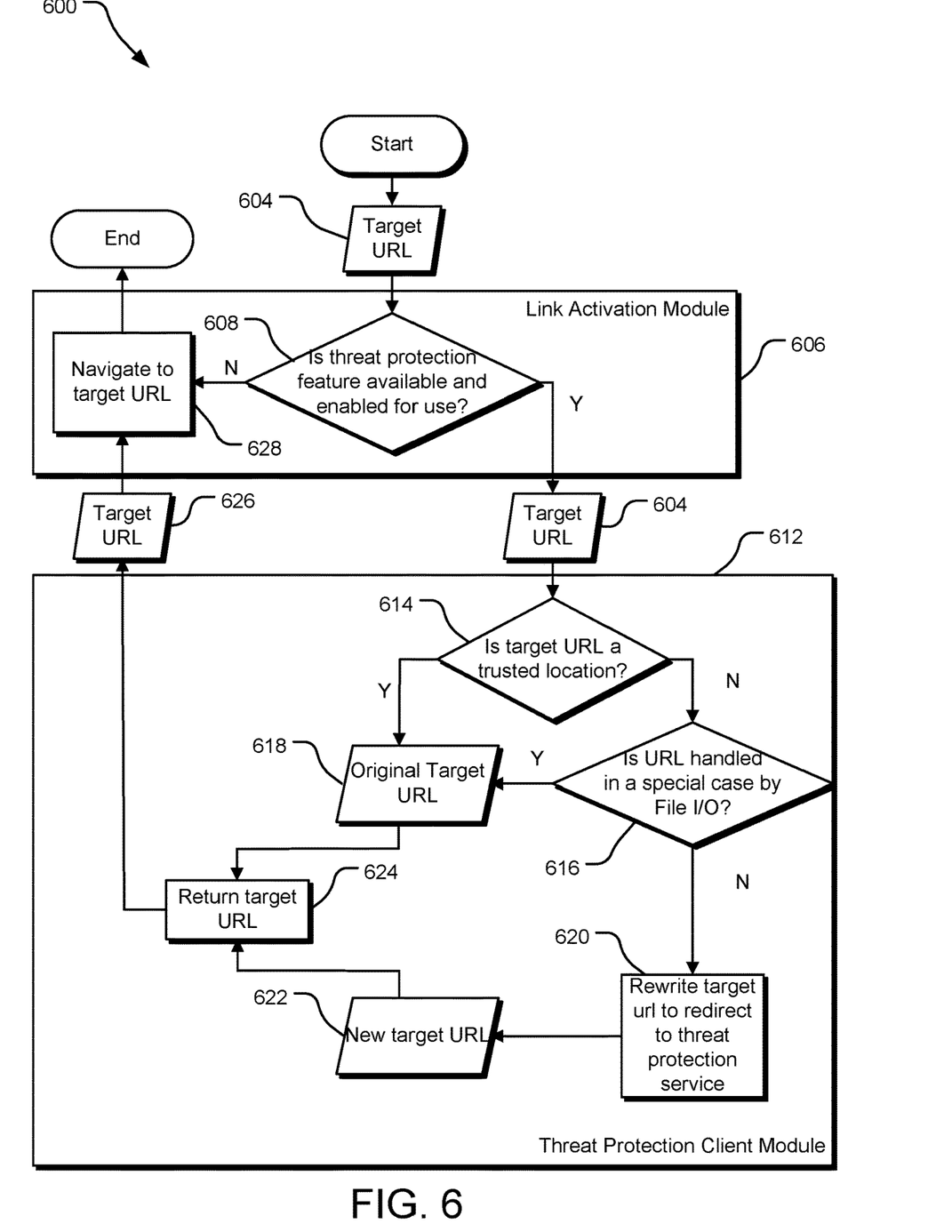
FIG. 6 illustrates example operations performed by the one or more modules of the threat protection system disclosed herein.

FIG. 6 illustrates example operations 600 performed by one or more modules of the threat protection system disclosed herein. A target URL or a link 604 may be a URL selected by a user in a document. A link activation module 606 receives the target URL 604. At operation 608, the link activation module 606 determines if a threat protection feature is available for use. If no such threat protection feature is available, transfer is controlled to an operation 628 that navigates the user to the target URL. If such threat protection feature is available, a threat protection client module 612 is called with the target URL 604.

At an operation 614, the threat protection client module 612 determines if the target URL is a trusted location. If yes, at 618, the original target URL is determined to be returned to the link activation module 606. If not, an operation 616 determines if the URL is handled in a special case by a file input/output system. An example may be an http/https link that opens a document, such as a link to a file on cloud storage system. If yes, the control is transferred to the operation 618. However, if yes, an operation 620 rewrites the target URL to redirect the link activation module to a threat protection service. Subsequently, a new target URL 622 is returned to operation 624. The operation 624 returns one of the original target URL 618 or the new target URL 622 to as the target URL 626 to the link navigation module

606. One or more of the operations 600 may be executed by a client located on a user computing device, a client located on an enterprise server, or a cloud based service.

Figure 7:
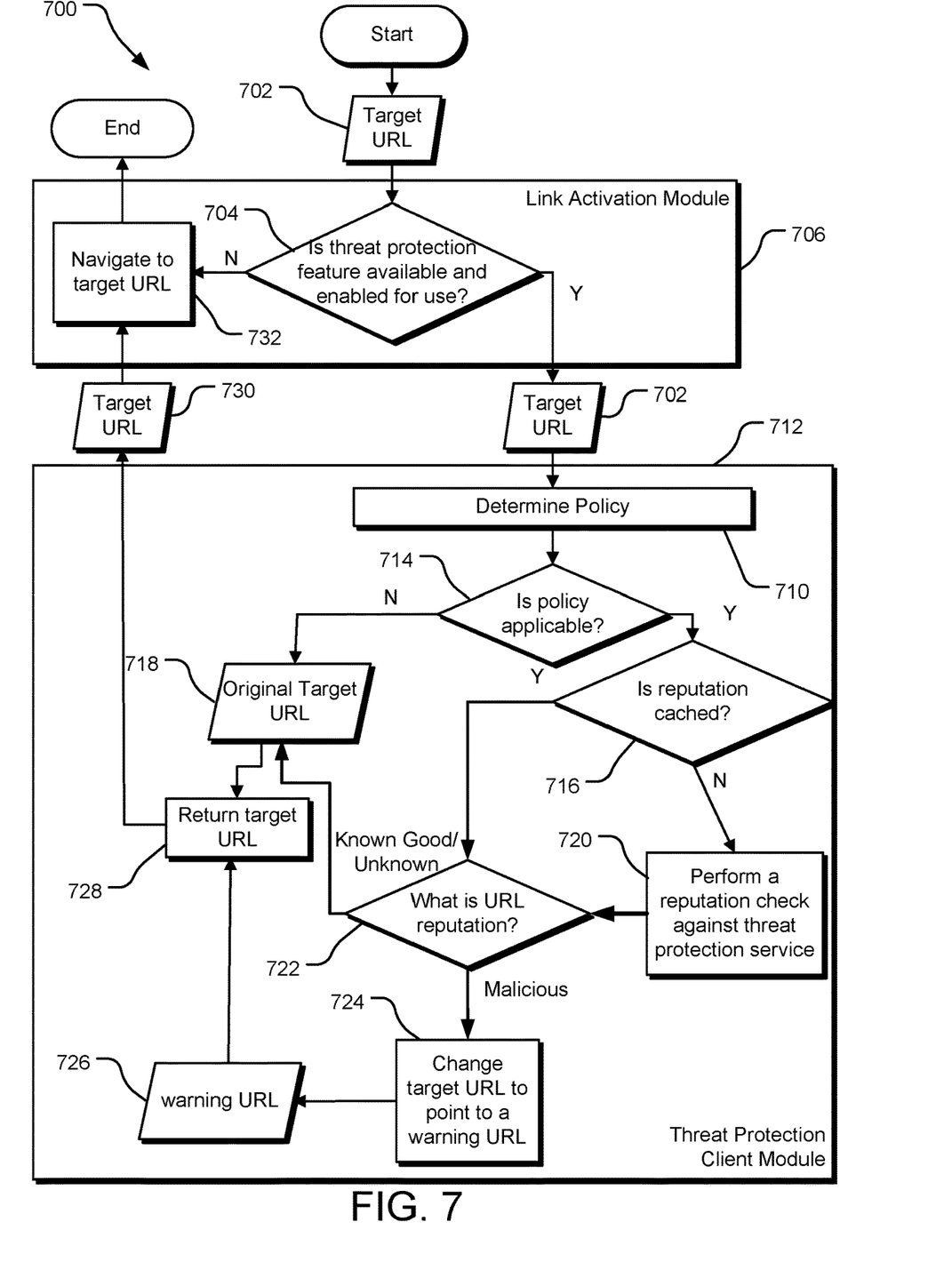
FIG. 7 illustrates example operations performed by the one or more modules of the threat protection system disclosed herein.

FIG. 7 illustrates example operations 700 performed by one or more modules of the threat protection system disclosed herein. A target URL or a link 702 may be a URL selected by a user in a document. A link activation module 706 receives the target URL 702. At operation 704, the link activation module 706 determines if a threat protection feature is available for use. If no such threat protection feature is available, transfer is controlled to an operation 732 that navigates the user to the target URL. If such threat protection feature is available, a threat protection client module 712 is called with the target URL 702.

At an operation 710, the threat protection client module 712 determines the policy for application of threat protection. An operation 714 determines if the policy is applicable. If no, at 718, the original target URL is determined to be returned to the link activation module 706. If yes, an operation 716 determines if the reputation of the target URL is cached. If no, an operation 720 performs a reputation check against a threat protection service, which may have a database of malicious URLs. If yes, an operation 722 determines the reputation of the URL. If the reputation is known to be good or unknown, at 718, the original target URL is determined to be returned to the link activation module 706.

If the reputation is determined to be malicious, an operation 724 changes the target URL to point to a warning URL 726. An operation 728 returns one of the original target URL 718 or the warning URL 726 as the target URL 730 to the link activation module 706. One or more of the operations 700 may be executed by a client located on a user computing device, a client located on an enterprise server, or a cloud based service.

Figure 8:
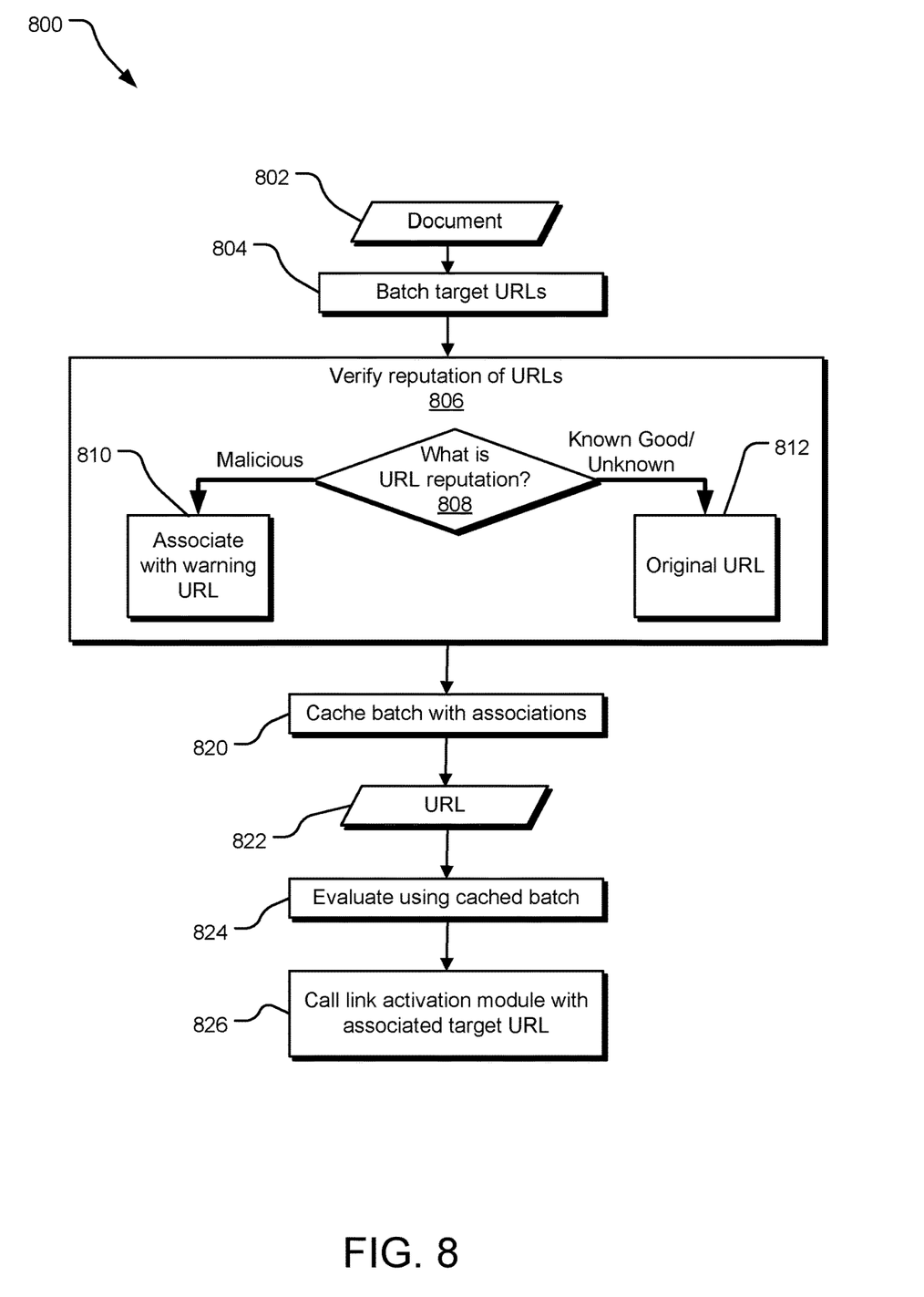
FIG. 8 illustrates example operations performed by the one or more modules of the threat protection system disclosed herein.

FIG. 8 illustrates example operations 800 performed by one or more modules of the threat protection system disclosed herein. A document 802 may be processed by these operations to reduce threat from malicious URLs. Upon activation of the document, an operation 804 batches various links or URLs from the document. A verification operation 806 may verify reputation of various URLs from the batch. For example, an operation 808 may contact a threat protection client module (not shown) to determine whether a given URL is malicious. If the URL is determined to be malicious, an operation 810 associates a warning URL to such malicious URL. If the URL is determined to be a known good URL or an unknown URL, an operation 812 keeps the original URL as the target URL.

An operation 820 caches the batch of URLs with their associations. For example, such cache may include a table with each original URL associated with a target URL in a manner disclosed in Table I.

TABLE I

| Original URL | Malicious? | Target URL |
| --- | --- | --- |
| http://www.abc.com | N | http://www.abc.com |
| http://www.malicious.com | Y | http://www.threatprotection.com |
| ... | ... | ... |

An operation 822 receives a selection of a URL by a user. In response, an operation 824 refers to the cached table to determine the target URL. For example, if the user had selected the URL http://www.malicious.com, the operation 824 may determine that the URL http://threatprotection.com is to be used. An operation 826 calls a link activation module with the associated target URL. One or more of the operations 800 may be executed by a client located on a user computing device, a client located on an enterprise server, or a cloud based service.

Figure 9:
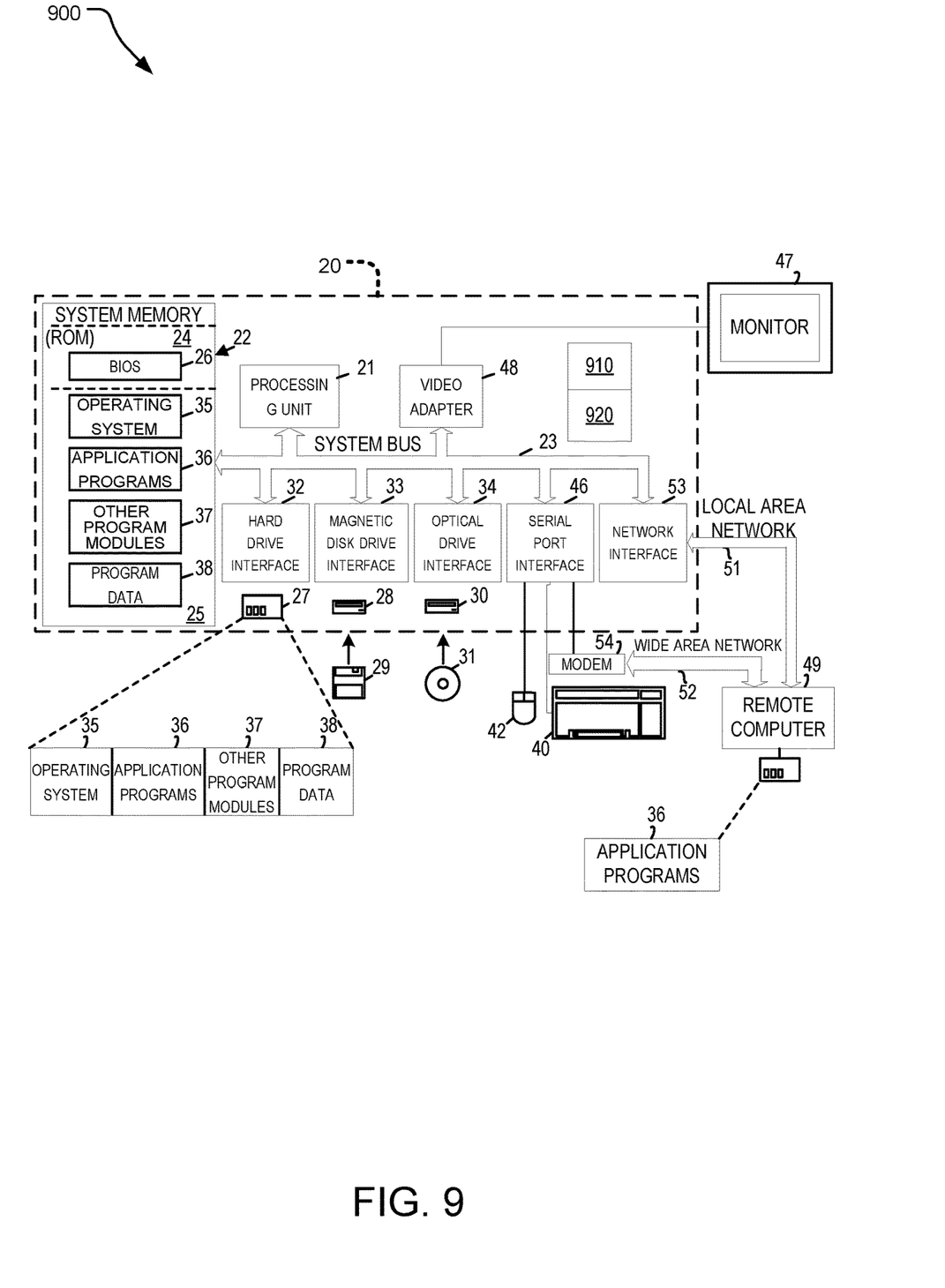
FIG. 9 illustrates an example system that may be useful in implementing the threat protection system disclosed herein.

FIG. 9 illustrates an example system 900 that may be useful in implementing the threat protection system disclosed herein. The example hardware and operating environment of FIG. 9 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 9, for example, the computer 20 includes a processing unit 21, a system memory 22, and a system bus 23 that operatively couples various system components including the system memory to the processing unit 21. There may be only one or there may be more than one processing unit 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited. In the example implementation of the computing system 900, the computer 20 also includes a link activation module 910 and/or a threat protection client module 920.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read-only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The computer 20 may be used to implement the link activation module 910 configured to determine if a threat protection feature is available for use as illustrated in FIGS. 7 and 8. The computer 20 may also be used to implement the threat protection client module 920 to determine the policy for application of threat protection. In one implementation, the link activation module 910 and the threat protection client module 920 may be stored in memory of the computer 20, such as the read-only memory (ROM) 24 and random access memory (RAM) 25, etc.

Furthermore, instructions stored on the memory of the computer 20 may be used to generate a transformation matrix using one or more operations disclosed in FIG. 5. Similarly, instructions stored on the memory of the computer 20 may also be used to implement one or more operations of FIG. 6 to determine a correct unwrapping tuple. The memory of the computer 20 may also store an LUT, such as the one dimensional LUT disclosed in FIG. 8.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 9 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other means of communications devices for establishing a communications link between the computers may be used.

In an example implementation, software or firmware instructions for requesting, processing, and rendering mapping data may be stored in system memory 22 and/or storage devices 29 or 31 and processed by the processing unit 21. Mapping data and/or layer prioritization scheme data may be stored in system memory 22 and/or storage devices 29 or 31 as persistent data-stores.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments of the threat protection system may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The threat protection system disclosed herein may include a variety of tangible computer-readable storage media and intangible computer-readable communication signals. Tangible computer-readable storage can be embodied by any available media that can be accessed by the threat protection system disclosed herein and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the threat protection system disclosed herein. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals moving through wired media such as a wired network or direct-wired connection, and signals moving through wireless media such as acoustic, RF, infrared and other wireless media.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

The threat protection system disclosed herein provides solution to a technological problem necessitated by security threats experienced by users when using various documents. Specifically, the threat protection system disclosed herein provides an unconventional technical solution to this technological problem by reducing security threats presented by links in the documents by detecting links in a document and analyzing whether one of the detected links is a malicious link that may direct a user of the document to a malicious universal resource locator (URL).

A method disclosed herein for providing threat protection in documents includes determining that a link in a document is selected, in response to determining that a link in a document is selected, calling a threat protection client module with the selected link, receiving an indication from the threat protection client module that the selected link is directed to a malicious universal resource locator (URL), and in response to receiving the indication that the selected link is directed to a malicious URL, sending a URL of a warning page to the document. In one implementation, the method further includes initiating a timer upon calling the threat protection client module and in response to determining that no response is received from the threat protection client module before expiration of the timer, activating the selected link.

In another implementation, the method further includes analyzing the selected link by comparing the selected link with a plurality of malicious links. Alternatively, analyzing the link further includes analyzing the link to determine if the selected link is at least one of a hypertext transfer protocol (http) link and a hypertext transfer protocol secure (https) link and in response to determining that the selected link is at least one of an http link and an https link, activating the selected link. In yet another implementation, the method further includes determining that the selected link is not directed to a malicious URL and in response to determining that the selected link is not directed to a malicious URL, activating the link.

In an alternative implementation, the method further includes, in response to determining an identity of a user of the document, using a threat protection policy associated with the identity, wherein the threat protection policy associated with the identity requires verifying the selected link by the threat protection client module. Alternatively, calling the threat protection client module with the selected link in response to determining that a link in a document is selected, further including calling the threat protection client module with the selected link in response to determining that a threat protection feature is available and enabled for the document. In one implementation, the method further includes analyzing a document to generate a batch of links in the document.

In yet another implementation, the method further includes analyzing another document to generate a batch of links in the another document. Alternatively, calling the threat protection client module with the selected link in response to determining that a link in a document is selected further comprising calling the threat protection client module with the batch of links in the another document. In yet another implementation, the method also includes determining if the selected link is handled by a file input/output (I/O) system and in response to determining that the selected link is handled by a file input/output (I/O) system activating the selected link.

Another implementation of the threat protection system disclosed herein provides a method including analyzing a document to generate a batch of links in the document, calling a threat protection client module with the batch of links, receiving the batch of links with their associated URLs, wherein one or more links of the batch of links directed to a malicious URL are associated with a URL of a warning page, and caching the batch of links with their associated URLs. Alternatively, the method also includes, in response to determining that a link in the document is selected, activating the URL associated with the selected link.

In another implementation, the method further includes determining if the selected link is handled by a file input/output (I/O) system and in response to determining that the selected link is handled by a file input/output (I/O) system activating the selected link. Alternatively, the method further includes analyzing each of the batch of links to determine if one or more of the batch of links is directed to a malicious URL and in response to determining that one or more of the batch of links is directed to a malicious URL associating the one or more of the batch of links to the warning page.

Another implementation of the threat protection system disclosed herein includes a physical article of manufacture including one or more tangible computer-readable storage media, encoding computer-executable instructions for executing on a computer system a computer process, where the computer process includes determining that a link in a document is selected, in response to determining that a link in a document is selected, calling a threat protection client module with the selected link, receiving an indication from the threat protection client module that the selected link is directed to a malicious universal resource locator (URL), and in response to receiving the indication that the selected link is directed to a malicious URL, sending a URL of a warning page to the document.

In one alternative implementation, the computer process further includes initiating a timer upon calling the threat protection client module and in response to determining that no response is received from the threat protection client module before expiration of the timer, activating the selected link. Alternatively, calling the threat protection client module with the selected link in response to determining that a link in a document is selected further includes calling the threat protection client module with a batch of links from the document. In another implementation, the computer process further includes receiving the batch of links with their associated URLs from the threat protection module and caching the batch of links with their associated URLs.

Alternatively, the computer process further includes analyzing the selected link by comparing the selected link with a plurality of malicious links.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A method for providing threat protection in documents, the method comprising:
   determining that a link in a document is selected, wherein the document is received as an attachment to a message;
   in response to determining that the link in the document is selected, calling a threat protection client module with the selected link;
   in response to receiving an indication from the threat protection client module that the selected link is directed to a malicious uniform resource locator (URL), causing a link activation module to generate a warning page; and
   in response to determining that the selected link is at least one of a hypertext transfer protocol (http) link and a hypertext transfer protocol secure (https) link, activating the selected link.

2. The method of claim 1, further comprising:
   initiating a timer upon calling the threat protection client module; and
   in response to determining that no response is received from the threat protection client module before expiration of the timer, activating the selected link.

3. The method of claim 1, further comprising analyzing the selected link by comparing the selected link with a plurality of malicious links.

4. The method of claim 1, further comprising determining that the selected link is not directed to a malicious URL; and
   in response to determining that the selected link is not directed to a malicious URL, activating the link.

5. The method of claim 1, further comprising:
   in response to determining an identity of a user of the document, using a threat protection policy associated with the identity, wherein the threat protection policy associated with the identity. requires verifying the selected link by the threat protection client module.

6. The method of claim 1, wherein calling the threat protection client module with the selected link in response to determining that the link in the document is selected, further comprising calling the threat protection client module with the selected link in response to determining that a threat protection feature is available and enabled for the document.

7. The method of claim 1, further comprising analyzing another document to generate a batch of links in the another document.

8. The method of claim 7, wherein calling the threat protection client module with the selected link in response to determining that a link in a document is selected further comprising calling the threat protection client module with the batch of links in the another document.

9. The method of claim 1, further comprising:
   determining if the selected link is handled by a file input/output (I/O) system; and
   in response to determining that the selected link is handled by a file input/output (I/O) system activating the selected link.

10. A system comprising:
    memory;
    one or more processor units; and
    a link activation module stored in the memory and executable by the one or more processor units, the link activation module encoding computer-executable instructions on the memory for executing on the one or more processor units a computer process, the computer process comprising:
    analyzing a document to generate a batch of links in the document, wherein the document is received at a computer as an attachment to an incoming message and wherein the batch of links includes one or more links,
    calling a threat protection client module with the batch of links,
    receiving, from the threat protection client module, the batch of links with their associated URLs, wherein one or more links of the batch of links directed to a malicious URL are associated with a URL of a warning page, and
    in response to determining that one of the one or more links is handled by a file input/output (I/O) system, activating the one of the one or more links.

11. The system of claim 10, wherein the computer process further comprising in response to determining that a link in the document is selected, activating the URL associated with the selected link.

12. The system of claim 10, wherein the computer process further comprising analyzing each of the batch of links to determine if one or more of the batch of links is directed to a malicious URL.

13. The system of claim 12, wherein the computer process further comprising:
    in response to determining that one or more of the batch of links is directed to a malicious URL associating the one or more of the batch of links to the warning page.

14. A physical article of manufacture including one or more tangible computer-readable storage media, encoding computer-executable instructions for executing on a computer system a computer process, the computer process comprising:
    determining that a link in a document is selected, wherein the document is received as an attachment to an incoming message and opened on a machine;
    in response to determining that the link in the document is selected, calling a threat protection client module with the selected link;
    in response to receiving an indication from the threat protection client module that the selected link is directed to a malicious URL, sending a warning page to the document; and
    in response to determining that the selected link is handled by a file input/output (I/O) system activating the selected link.

15. The physical article of manufacture of claim 14, wherein the computer process further comprising:
    initiating a timer upon calling the threat protection client module; and
    in response to determining that no response is received from the threat protection client module before expiration of the timer, activating the selected link.

16. The physical article of manufacture of claim 14, wherein calling the threat protection client module with the selected link in response to determining that a link in a document is selected further comprising calling the threat protection client module with a batch of links from the document.

17. The physical article of manufacture of claim 16, wherein the computer process further comprising receiving the batch of links with their associated URLs from the threat protection module and caching the batch of links with their associated URLs.

18. The physical article of manufacture of claim 14, wherein the computer process further comprising analyzing the selected link by comparing the selected link with a plurality of malicious links.

* * * * *